United States Patent
Sun et al.

(10) Patent No.: US 9,207,523 B2
(45) Date of Patent: Dec. 8, 2015

(54) PROJECTOR WITH FAN AND HEAT SINKS

(71) Applicant: HON HAI PRECISION INDUSTRY CO., LTD., New Taipei (TW)

(72) Inventors: Ming-Chih Sun, New Taipei (TW); Kai Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 79 days.

(21) Appl. No.: 13/873,192

(22) Filed: Apr. 29, 2013

(65) Prior Publication Data

US 2014/0198304 A1   Jul. 17, 2014

(30) Foreign Application Priority Data

Jan. 17, 2013  (TW) .............................. 102101843 A

(51) Int. Cl.
*G03B 21/16* (2006.01)
*G03B 21/14* (2006.01)
*H04N 9/31* (2006.01)

(52) U.S. Cl.
CPC .............. *G03B 21/16* (2013.01); *G03B 21/145* (2013.01); *H04N 9/3144* (2013.01)

(58) Field of Classification Search
CPC ...... G03B 21/00; G03B 21/14; G03B 21/145; G03B 21/16; G03B 21/20; H04N 9/31; H04N 9/3141; H04N 9/3144
USPC ............................ 353/52, 57–58, 60–61, 119
See application file for complete search history.

(56) References Cited

U.S. PATENT DOCUMENTS

| | | | | |
|---|---|---|---|---|
| 6,350,033 | B1 * | 2/2002 | Fujimori | 353/61 |
| 6,641,267 | B2 * | 11/2003 | Ohishi et al. | 353/61 |
| 7,296,898 | B2 * | 11/2007 | Wu | 353/52 |
| 7,384,151 | B2 * | 6/2008 | Seki | 353/52 |
| 7,510,285 | B2 * | 3/2009 | Takemi et al. | 353/61 |
| 7,631,973 | B2 * | 12/2009 | Matsumiya et al. | 353/57 |
| 7,841,721 | B2 * | 11/2010 | Momose et al. | 353/54 |
| 7,862,186 | B2 * | 1/2011 | Hamada | 353/119 |
| 8,052,282 | B2 * | 11/2011 | Chen et al. | 353/52 |
| 8,246,171 | B2 * | 8/2012 | Chen et al. | 353/61 |
| 2005/0073658 | A1 * | 4/2005 | Chang et al. | 353/52 |
| 2005/0122721 | A1 * | 6/2005 | Hori | 362/268 |
| 2006/0028621 | A1 * | 2/2006 | Gupta et al. | 353/52 |
| 2007/0052930 | A1 * | 3/2007 | Ki | 353/57 |
| 2007/0139887 | A1 * | 6/2007 | Lee et al. | 361/700 |
| 2007/0216874 | A1 * | 9/2007 | Suzuki | 353/57 |
| 2007/0273839 | A1 * | 11/2007 | Doi et al. | 353/57 |
| 2008/0002156 | A1 * | 1/2008 | Hsu | 353/57 |
| 2009/0290131 | A1 * | 11/2009 | Kim et al. | 353/61 |
| 2010/0118280 | A1 * | 5/2010 | Chen et al. | 353/61 |
| 2010/0328633 | A1 * | 12/2010 | Sato et al. | 353/99 |
| 2014/0204345 | A1 * | 7/2014 | Chen et al. | 353/31 |

FOREIGN PATENT DOCUMENTS

| | | |
|---|---|---|
| CN | 101923274 A | 12/2010 |
| CN | 201673359 U | 12/2010 |
| TW | 514350 U | 12/2002 |

* cited by examiner

*Primary Examiner* — Jori S Reilly-Diakun
(74) *Attorney, Agent, or Firm* — Novak Druce Connolly Bove + Quigg LLP

(57) ABSTRACT

A projector includes a case, an optical engine, a heat sink, a circuit board, and a fan. The case includes two sidewalls, and each sidewall defines an air hole. The optical engine is received in the case. The heat sink is positioned on the optical engine. The circuit board is positioned between the heat sink and one of the sidewalls. The fan is received in the case. The air holes of the two sidewalls and the fan form a dissipating passage. The heat sink and the circuit board are positioned in the dissipating passage.

4 Claims, 4 Drawing Sheets

PROJECTOR WITH FAN AND HEAT SINKS

BACKGROUND

1. Technical Field

The present disclosure relates to projectors and, particularly, to a projector capable of effectively dissipating heat.

2. Description of Related Art

Projectors need more than one fan for dedicating heat dissipation of various heat sources, such as light source and circuit board, which increases the size and the cost of the projector and generates more noise.

Therefore, it is desirable to provide a projector, which can overcome the limitations described.

DETAILED DESCRIPTION

Embodiments of the disclosure will be described with reference to the drawings.

Figure 1:
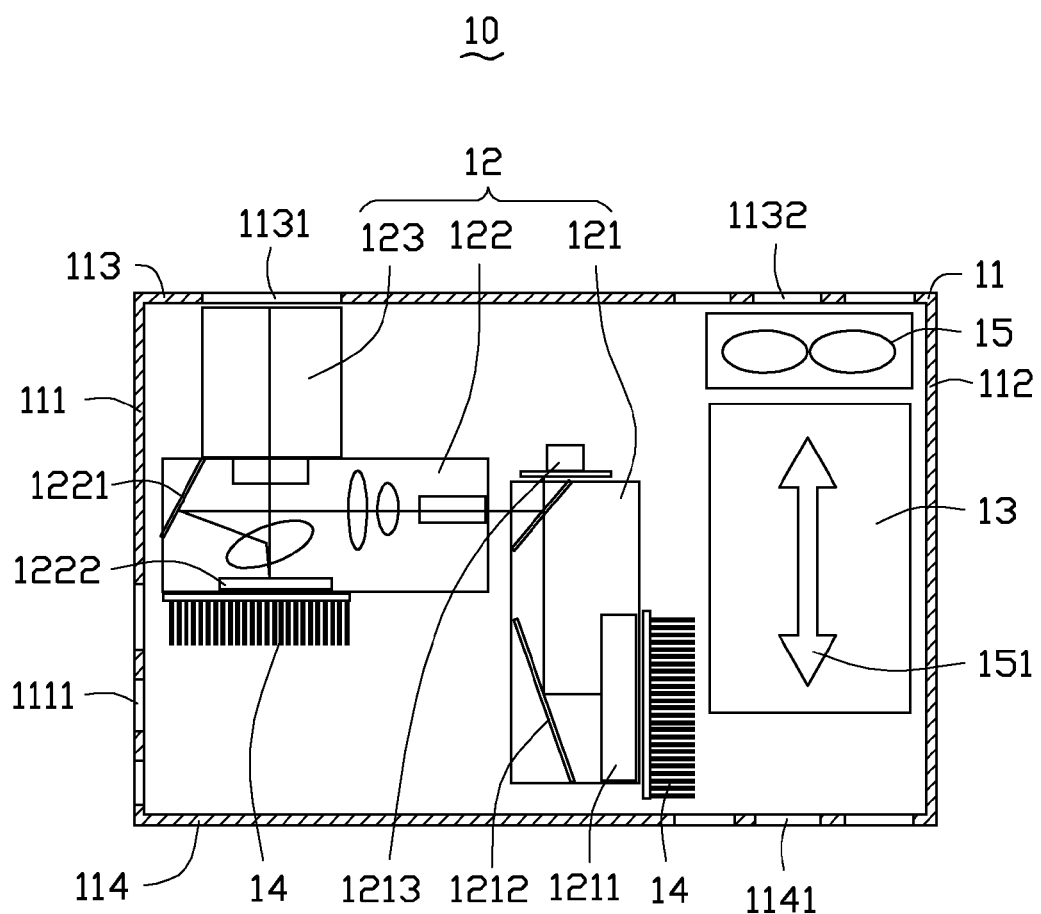
FIG. 1 is a schematic view of a projector in accordance with a first exemplary embodiment.

FIG. 1 shows a projector 10 according to a first exemplary embodiment. The projector 10 includes a case 11, an optical engine 12, a circuit board 13, two heat sinks 14, and a fan 15. In this embodiment, the projector 10 is a digital light processor (DLP) projector.

The case 11 is a cuboid and includes a first sidewall such as a left sidewall 111, a second sidewall such as a right sidewall 112, a third sidewall such as a front sidewall 113, and a fourth sidewall such as a rear sidewall 114. The left sidewall 111 is opposite to the right sidewall 112, and the front sidewall 113 is opposite to the rear sidewall 114. The left sidewall 111 and the right sidewall 112 are respectively connected between the front sidewall 113 and the rear sidewall 114. The left sidewall 111 defines a left air hole 1111. The front sidewall 113 defines a lens hole 1131 adjacent to the left sidewall 111 and a front air hole 1132 adjacent to the right sidewall 112. The rear sidewall 114 defines a rear air hole 1141 adjacent to the right sidewall 112.

The optical engine 12 is received in the case 11 and includes a light emitting module 121, a light projecting module 122, and a lens 123. The light emitting module 121 and the lens 123 positioned at two opposite sides of the light projecting module 122, and generally adjacent to two ends of the light projecting module 122.

The light emitting module 121 is perpendicular to the rear sidewall 114, generally at a middle of the left sidewall 111 and the right sidewall 122. The light emitting module 121 includes a light source 1211, a first optical group 1212, and a RGB fluorescence wheel 1213. The light source 1211 faces the left air hole 1111. The RGB fluorescence wheel 1213 faces the rear sidewall 114. The first optical group 1212 is positioned between the light source 1211 and the RGB fluorescence wheel 1213. A direction of light rays emitted from the light source 1211 is perpendicular to the left sidewall 111, and the light rays penetrate the first optical group 1212 and project on the RGB fluorescence wheel 1213. The RGB fluorescence wheel 1213 is excited by the light rays projected thereon, and emits red light rays, green light rays, and blue light rays to the first optical group 1212. The first optical group 1212 reflects the red light rays, the green light rays, and the blue light rays toward the left sidewall 111. In the embodiment, the light source 1211 is a laser source emitting a monocolor laser or a multi-color laser.

The light projecting module 122 is perpendicular to the left sidewall 111, generally at a middle of the front sidewall 113 and a middle of the rear sidewall 114. The light projecting module 122 includes a second optical group 1221 and a digital micro device (DMD) 1222. The DMD 1222 faces the lens hole 1131. The second optical group 1221 is positioned between the first optical group 1212 and the DMD 1222. The light rays emitted from the first optical group 1212 are projected into the second optical group 1221. The light rays are reflected to the DMD 1222 by the second optical group 1221, and the DMD 1222 reflects the light rays toward the front sidewall 113.

The lens 123 is positioned between the light projecting module 13 and the front sidewall 113. The lens 123 penetrates from the lens hole 1131. The light rays emitted from the DMD 1222 are projected to the lens 123. The light rays penetrate the lens 123 and projects on a screen (not shown).

The circuit board 13 is positioned between the front sidewall 113 and the rear sidewall 114, and adjacent to the right sidewall 112. The circuit board 13 faces the front air hole 1132 and the rear air hole 1141. The circuit board 13 is electrically connected to the optical engine 12 and the fan 15, and supplies power to the optical engine 12 and the fan 15.

The heat sinks 14 are positioned on the optical engine 12. One of the heat sinks 14 is attached on the light source 1211, and adjacent to the rear air hole 1141 and the circuit board. Another heat sink 14 is attached on the DMD 1222, and adjacent to the left air hole 1111. The heat sink 14 that is attached on the light source 1211 is positioned between the front air hole 1132 and the rear air hole 1141. In this embodiment, an extending direction of the heat sink 14 that is attached on the light source 1211 is parallel with the left sidewall 111 and the right sidewall 112, an extending direction of the heat sink 14 that is attached on the DMD 1222 is perpendicular to the left sidewall 111 and the right sidewall 112.

The fan 15 is received in the case 11, and is positioned between the front sidewall 113 and the circuit board 13. The fan 15 faces the front air hole 1132. The fan 16 is an aerofoil fan. The front air hole 1132, the fan 15, and the rear air hole 1141 form a dissipating passage 151. The heat sink 14 attached on the light source 1211 is positioned in the dissipating passage 151. A cool air is sucked into the case 11 from the rear air hole 1141 by the fan 15, and a heat air is blown out the case 11 via the front air hole 1132 by the fan 15.

In use, heat generated by the light source 1211 is dissipated (e.g., conducted) by the heat sink 14. Heat generated by DMD 1222 is dissipated by the another heat sink 14. The heat air is sucked from the rear air hole 1141 and the cool air is drawn in from the front air hole 1132 under the movement of the fan 15. Therefore, the light source 1221 and the circuit board 13 positioned in the dissipating passage 151 can be cooled with one fan 15.

Figure 2:
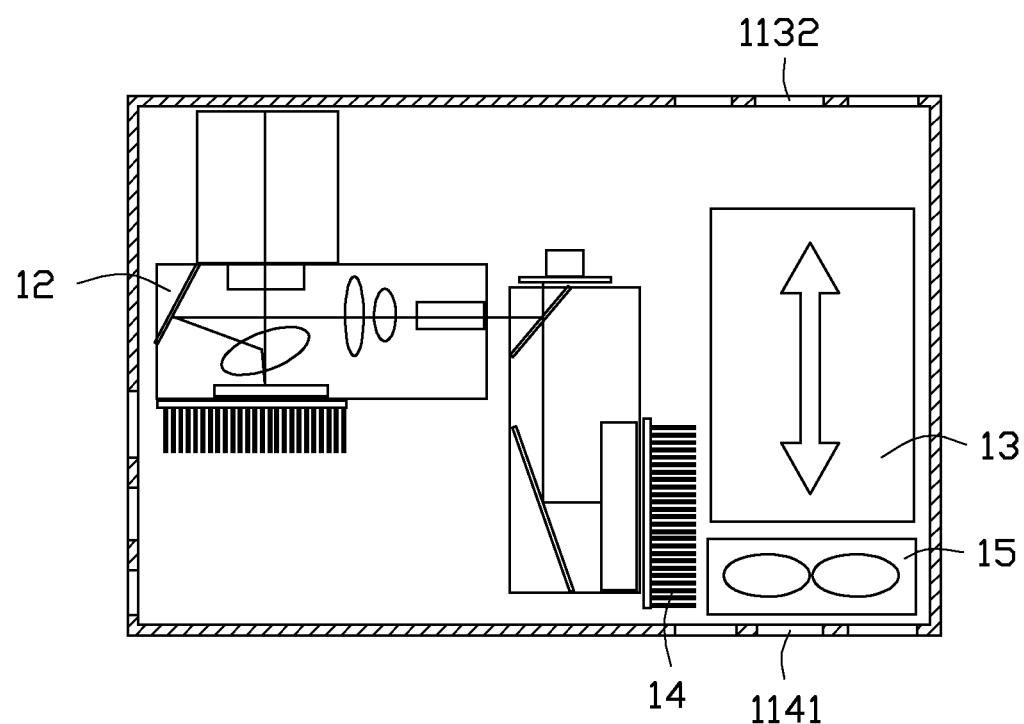
FIG. 2 is a schematic view of a projector in accordance with a second exemplary embodiment.

FIG. 2 shows a projector 20 according to a second exemplary embodiment. The difference between the projector 20 of the second exemplary embodiment and the projector 10 of the first exemplary embodiment is that the fan 15 is positioned between the rear sidewall 114 and the circuit board 13. The fan 15 faces the rear air hole 1141.

Figure 3:
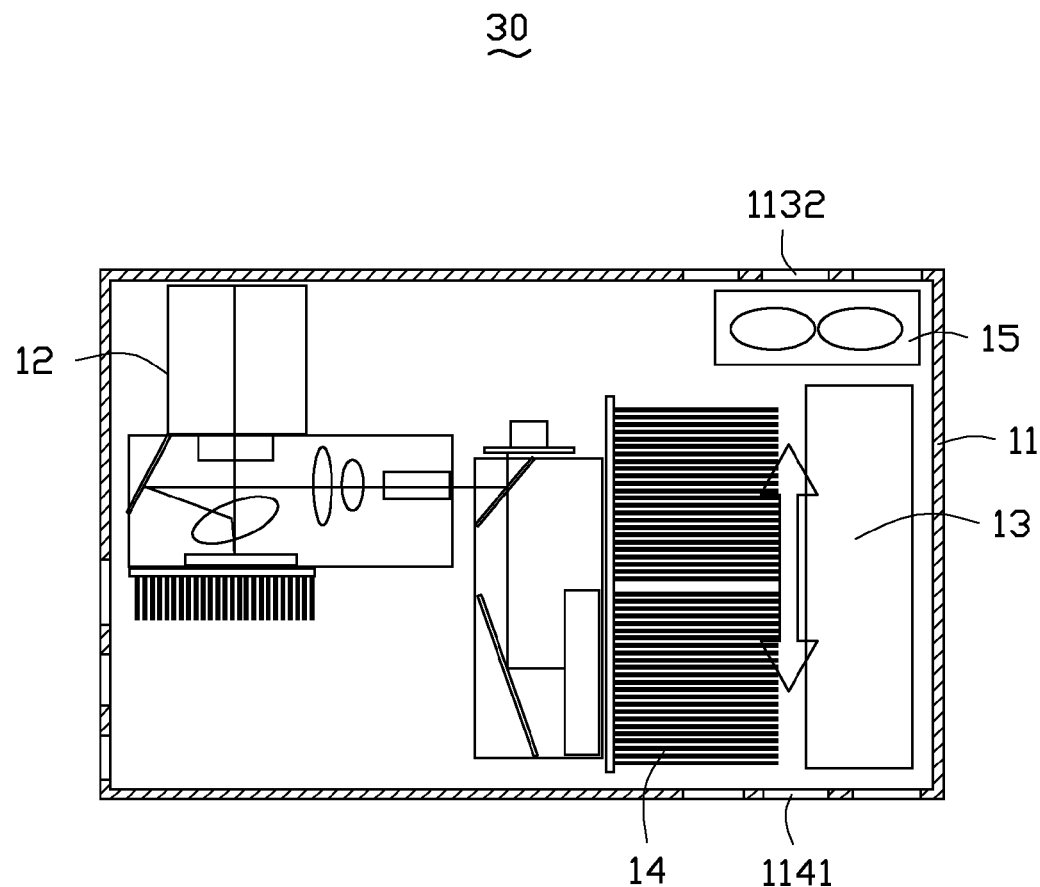
FIG. 3 is a schematic view of a projector in accordance with a third exemplary embodiment.

FIG. 3 shows a projector 30 according to a third exemplary embodiment. The difference between the projector 30 of the third exemplary embodiment and the projector 10 of the first exemplary embodiment is that the heat sink 14 that is attached on the light source 1221 extends from one end of the light emitting module 121 to another end of the light emitting module 121. The width of the circuit board 13 of the third exemplary embodiment is less than the width of the circuit board 13 of the first exemplary embodiment, therefore the width of the heat sink 14 that is attached on the light source 1221 of the third exemplary embodiment is greater than the width of the heat sink 14 that is attached on the light source 1221 of the first exemplary embodiment.

Figure 4:
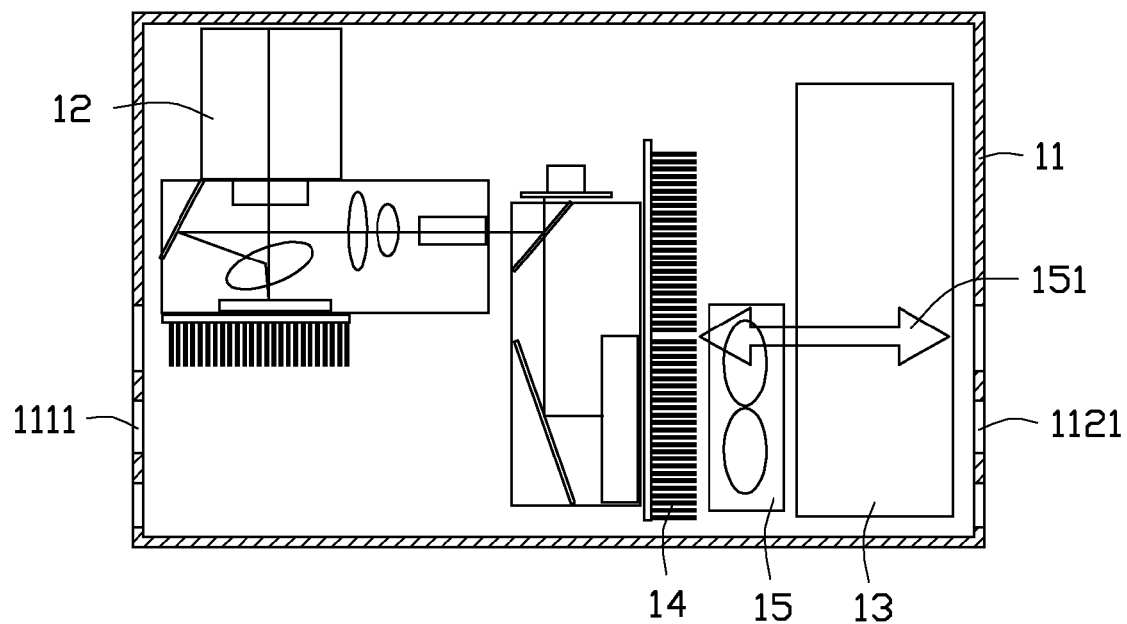
FIG. 4 is a schematic view of a projector in accordance with a fourth exemplary embodiment.

FIG. 4 shows a projector 40 according to a fourth exemplary embodiment. The difference between the projector 40 of the fourth exemplary embodiment and the projector 10 of the first exemplary embodiment is that the right sidewall 112 defines a right air hole 1121. The fan 15 is positioned between the heat sink 14 attached on the light source 1221 and the circuit board 13, and faces the right air hole 1121. The heat sink 14 attached on the light source 1221 extends from one end of the light emitting module 121 to another end of the light emitting module 121. The left air hole 1111, the fan 15, and the right air hole 1121 form the dissipating passage 151.

Particular embodiments are shown and are described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A projector, comprising:
    a case comprising four sidewalls, at least two of the four sidewalls defining an air hole, the air holes of the at least two sidewalls being opposite to each other;
    an optical engine received in the case;
    a heat sink positioned on the optical engine;
    a circuit board positioned between the heat sink and one of the sidewalls, and facing the air holes of the at least two sidewalls; and
    a fan received in the case, the air holes of the at least two sidewalls and the fan forming a dissipating passage, the heat sink and the circuit board being positioned in the dissipating passage;
    wherein, the four sidewalls comprise a left sidewall, a right sidewall, a front sidewall, and a rear sidewall, and the left sidewall and the right sidewall are respectively connected between the front sidewall and the rear sidewall;
    wherein, the air holes of the at least two sidewalls comprise a front air hole, a rear air hole, and a left air hole;
    the front sidewall defines the front air hole, the rear sidewall defines the rear air hole opposite to the front air hole, and the front air hole and the rear air hole and the fan form the dissipating passage;
    the optical engine comprises a light source, and the heat sink is attached on the light source;
    the optical engine comprises a light emitting module, a light projecting module, and a lens, and the light emitting module and the lens are positioned at two opposite sides of the light projecting module, and are generally adjacent to two ends of the light projecting module; the light source is disposed in the light emitting module;
    the left sidewall defines the left air hole;
    the light emitting module further comprises a first optical group and an RGB fluorescent wheel; the light source faces the left air hole; the RGB fluorescent wheel faces the rear sidewall;
    the first optical group is positioned between the light source and the RGB fluorescent wheel;
    the front sidewall further defines a lens hole adjacent to the left sidewall;
    the light projecting module comprises a second optical group and a digital micro device;
    the digital micro device faces the lens hole; and
    the second optical group is positioned between the first optical group and the digital micro device.

2. The projector of claim 1, wherein the lens is positioned between the light projecting module and the front sidewall, and protrudes from the lens hole.

3. The projector of claim 1, further comprising another heat sink attached on the digital micro device and being adjacent to the left air hole.

4. The projector of claim 3, wherein an extending direction of the heat sink that is attached on the digital micro device is perpendicular to the left sidewall and the right sidewall.

\* \* \* \* \*